United States Patent
Shigetomi et al.

(12) 
(10) Patent No.: US 6,535,465 B1
(45) Date of Patent: *Mar. 18, 2003

(54) INTEGRATED-DISK DRIVE HAVING AN INTELLIGENT ELECTRONIC CIRCUIT MOUNTED AS PART OF THE DISK

(75) Inventors: Takashi Shigetomi; Tetsuo Saito, both of Miyagi-ken; Tsunematsu Komaki, Tokyo, all of (JP)

(73) Assignee: Kabushiki Kaisha OPTROM, Miyagi-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/155,772
(22) PCT Filed: Jun. 18, 1998
(86) PCT No.: PCT/JP98/02702
§ 371 (c)(1),
(2), (4) Date: Oct. 2, 1998
(87) PCT Pub. No.: WO98/58379
PCT Pub. Date: Dec. 23, 1998

(30) Foreign Application Priority Data

Jun. 18, 1997 (JP) .............................................. 9-161668

(51) Int. Cl.⁷ .............................................. G11B 13/00
(52) U.S. Cl. .......................................... 369/14; 369/273
(58) Field of Search .......................... 369/14, 15, 272, 369/273, 274, 280; 360/132, 133

(56) References Cited

U.S. PATENT DOCUMENTS

| | | | | |
|---|---|---|---|---|
| 4,338,644 A | * | 7/1982 | Staar ........................... | 360/132 |
| 4,814,924 A | * | 3/1989 | Ozeki .......................... | 360/133 |
| 4,839,875 A | * | 6/1989 | Kuriyama et al. ............ | 369/14 |
| 4,868,373 A | * | 9/1989 | Opheij et al. ................. | 369/14 |
| 5,119,353 A | * | 6/1992 | Asakura ....................... | 369/14 |
| 5,235,586 A | * | 8/1993 | Feamster et al. ........... | 369/100 |
| 5,663,553 A | * | 9/1997 | Aucsmith .................... | 235/492 |
| 5,940,363 A | * | 8/1999 | Ro et al. ..................... | 369/273 |
| 6,295,564 B1 | * | 9/2001 | Shigetomi et al. ............ | 710/74 |

FOREIGN PATENT DOCUMENTS

JP      63-217569     *    9/1988

* cited by examiner

*Primary Examiner*—Tan Dinh
(74) *Attorney, Agent, or Firm*—Merchant & Gould P.C.

(57) ABSTRACT

The present invention provides a drive-integrated disk (an intelligent disk (ID)) having an electronic circuit controlling an external system as a peripheral. The drive-integrated disk comprises a disk block for storing information, a disk drive unit for accessing to the disk block, an electronic circuit block which connects to the disk drive unit via a bus, and a data input/output terminal group for connecting the electronic circuit block to an external apparatus, and is formed in a card shape.

5 Claims, 2 Drawing Sheets

INTEGRATED-DISK DRIVE HAVING AN INTELLIGENT ELECTRONIC CIRCUIT MOUNTED AS PART OF THE DISK

TECHNICAL FIELD

The present invention relates to a drive-integrated disk with a disk drive.

BACKGROUND ART

Up to now, drive-integrated disks have been proposed. Nevertheless, the disks are used as peripherals, and hence control of each system is performed by a processor in an external system.

DISCLOSURE OF THE INVENTION

The present invention provides a drive-integrated disk (hereinafter, this is called an intelligent disk (ID)) having an electronic circuit controlling an external system as a peripheral.

In order to solve this task, a drive-integrated disk of the present invention is characterized in that the disk comprises a disk block for storing information, a disk drive unit for accessing to the disk block, an electronic circuit block which connects to the disk drive unit via a bus, and a data input/output terminal group for connecting the electronic circuit block to an external apparatus.

Here, the drive-integrated disk is formed in a card shape, and the data input/output terminal group is located in correspondence with a standard terminal group of an IC card. In addition, the drive-integrated disk is formed in a card shape, and the data input/output terminal group is formed as a connector at least at an end of the card. In addition, a bootstrap program, system programs, and application programs are stored in the disk block and electronic circuit block is distributed at desired positions.

The present invention can provide a drive-integrated disk having an electronic circuit controlling an external system as a peripheral.

BEST MODE FOR CARRYING OUT THE INVENTION

For more detailed description of the present invention, an embodiment of the present invention will be described with reference to attached drawings.

Figure 1:
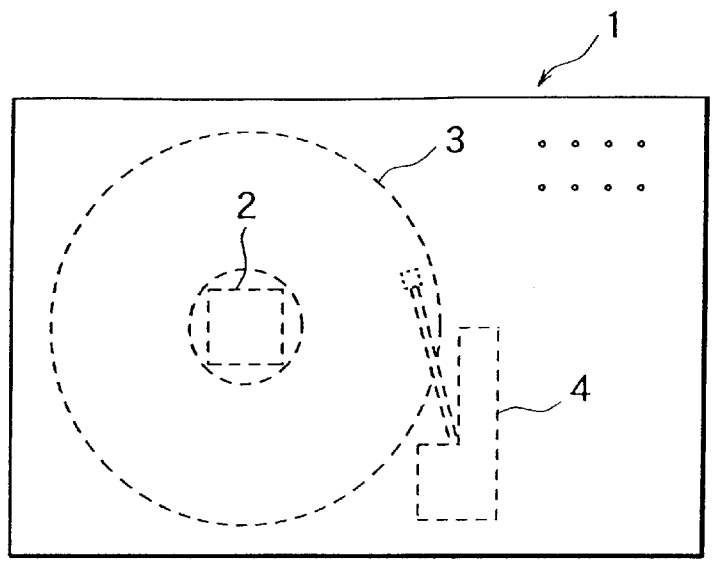
FIG. 1 is a sketch of an example of a drive-integrated disk that is this embodiment.

FIG. 1 is a sketch drawing of an example of a drive-integrated disk that is this embodiment. Here, since an ID 1 is formed in a card shape (hereinafter, this is called an ID card), the ID 1 can be substituted for an IC card by providing the same connector pins as those of an IC card.

The ID 1 comprises a disk block 3 that is a disk surface for storing information, an intelligent circuit block 2 mounted, for example, in the central portion thereof as shown in FIG. 1, and an optical disk drive unit 4 including a pickup (not shown) reading (or writing) information from the disk block (surface) 3 of the ID 1, and a pickup drive circuit (not shown) to have the pickup seek on the disk surface. Here, although the circuit block 2 is located in the central portion of the disk in FIG. 1, the location is not particularly limited, for example, it can also be located on a whole surface at a side of the disk or in a middle layer of a disk manufactured in plural layers.

Figure 2:
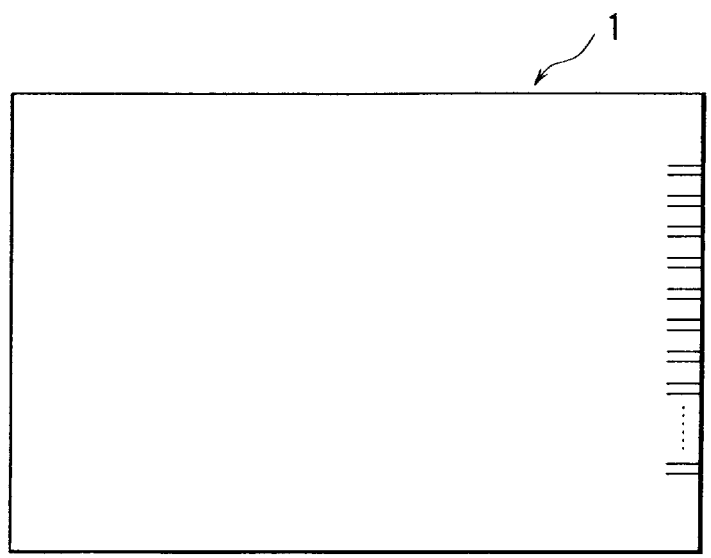
FIG. 2 is a sketch of another example of the drive-integrated disk that is this embodiment.

FIG. 2 shows the ID card having a connector at an end. The connector can be provided at the other end in correspondence to the objective of the ID card.

It becomes possible to keep process speed of an ID card system fast by avoiding limitation of quantity of data transfer and transfer speed between the ID card and external system through realizing bus connection between the ID card and a system side in this manner.

Figure 3:
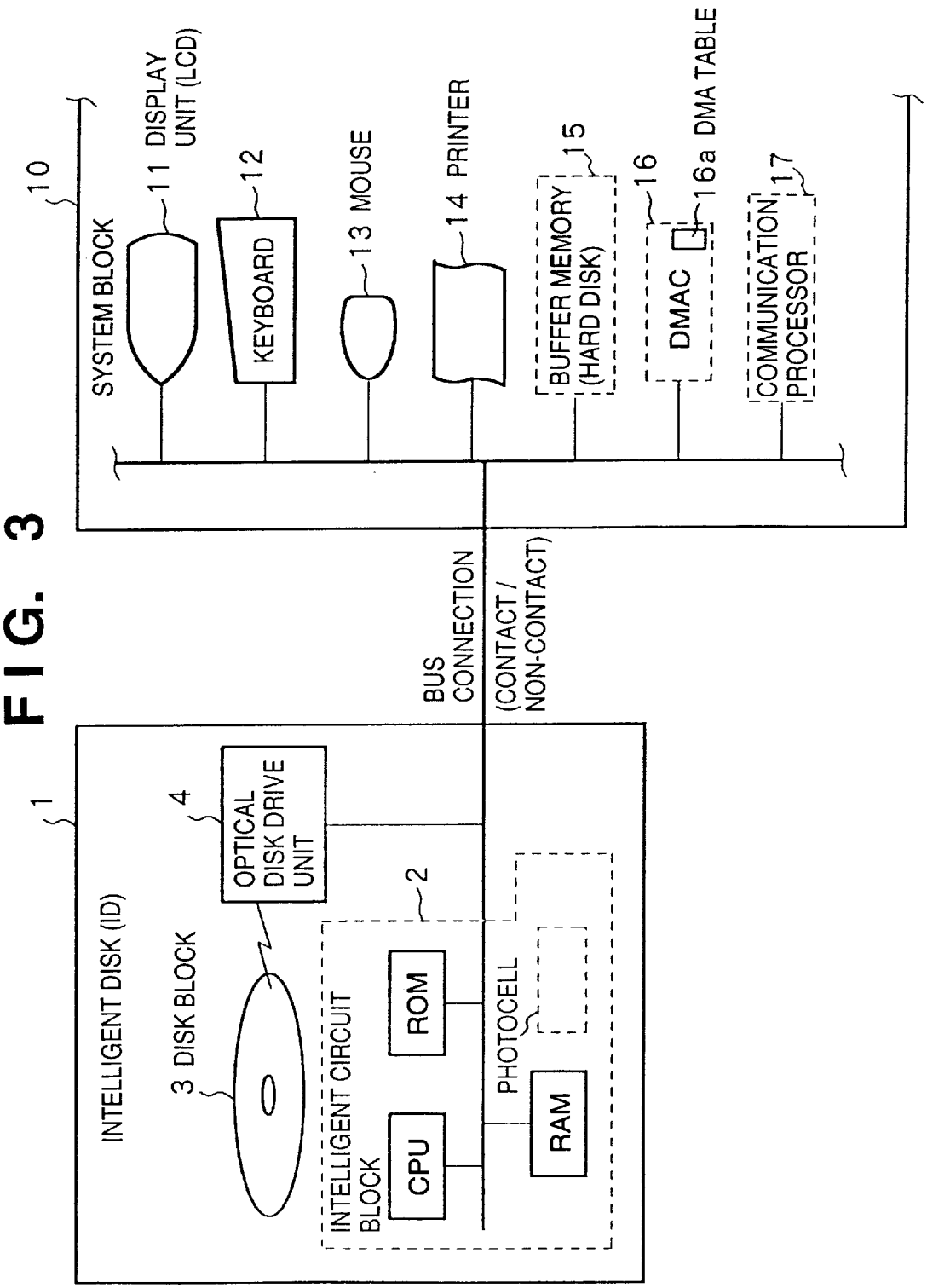
FIG. 3 is a drawing of an example of internal construction of the drive-integrated disk that is this embodiment.

FIG. 3 shows a constructive example of a computer system including the ID of this embodiment.

The intelligent circuit block 2 has ROM 22 for storing programs, RAM 23 for temporary storage, and a CPU 21 for executing programs stored in the ROM 22 and RAM 23. Numeral 24 shows a photocell that is necessary if the ID side has an independent power source.

On the other hand, a display unit 11, a keyboard 12, a mouse 13, a printer 14, a buffer memory 15, a DMAC 16 having a DMA table 16a, a communication processor 17, and the like are connected to the system block 10. In addition, the system block 10 can be a computer system having multiple functions or a specific device having a single function such as display and printing.

Connection between the intelligent circuit block 2 and system block 10 is a contact type or a non-contact type of bus-connection.

In this system, a CPU is not included in the external system block 10, and hence all the components operate under control of the CPU 21 in the ID 1. In addition, since an OS and application data are stored in the disk block, the system block 10 can be operated with the OS stored in an ID by inserting the ID. Thus, a bootstrap program, system programs, and application programs are stored in the disk block and electronic circuit block of this ID by being distributed at desired positions of the blocks. By providing a plurality of OSs and application programs in the disk block 3, performing selection display on the display unit 11, and further selecting from the display with the mouse 13 and the like, various types of OSs can be selectively started up so long as a system block 10 of a standard specification is provided.

In addition, according to this system, version up can be performed by replacing the ID even if processor development advances, like in the past several years, while users can freely build computer systems in either the old or new versions since hardware and software are in one-piece.

Hereinbefore, the present invention is described with preferred embodiments. Nevertheless, the present invention is not limited to the above-described embodiments and various changes, additions, and modifications can be made within the spirits and scope as set out in the accompanying claims.

What is claimed is:

1. A drive-integrated disk comprises, a card which includes a disk block for storing information;

a disk drive unit for accessing to the disk block;

an electronic circuit block which connects to the disk drive unit via a bus; and a data input/output terminal group for connecting the electronic circuit block to an external apparatus.

2. The drive-integrated disk according to claim 1, wherein said data input/output terminal group is formed as a connector at least at an end of the card.

3. The drive-integrated disk according to claim 1, wherein a bootstrap program, system programs, and application programs are stored in said disk block and electronic circuit block and are being distributed at desired positions.

4. The drive-integrated disk according to claim 1, wherein said disk block is formed on one of a front and rear surfaces of the disk and said electronic circuit block is formed on another of the front and rear surfaces of the disk.

5. The drive-integrated disk according to claim 1, wherein said data input/output terminal group is located in correspondence to a terminal group of an IC card.

* * * * *